ELLS & CHARLTON.
Seed-Planter.
No. 18,140.  Patented Sept. 8, 1857.
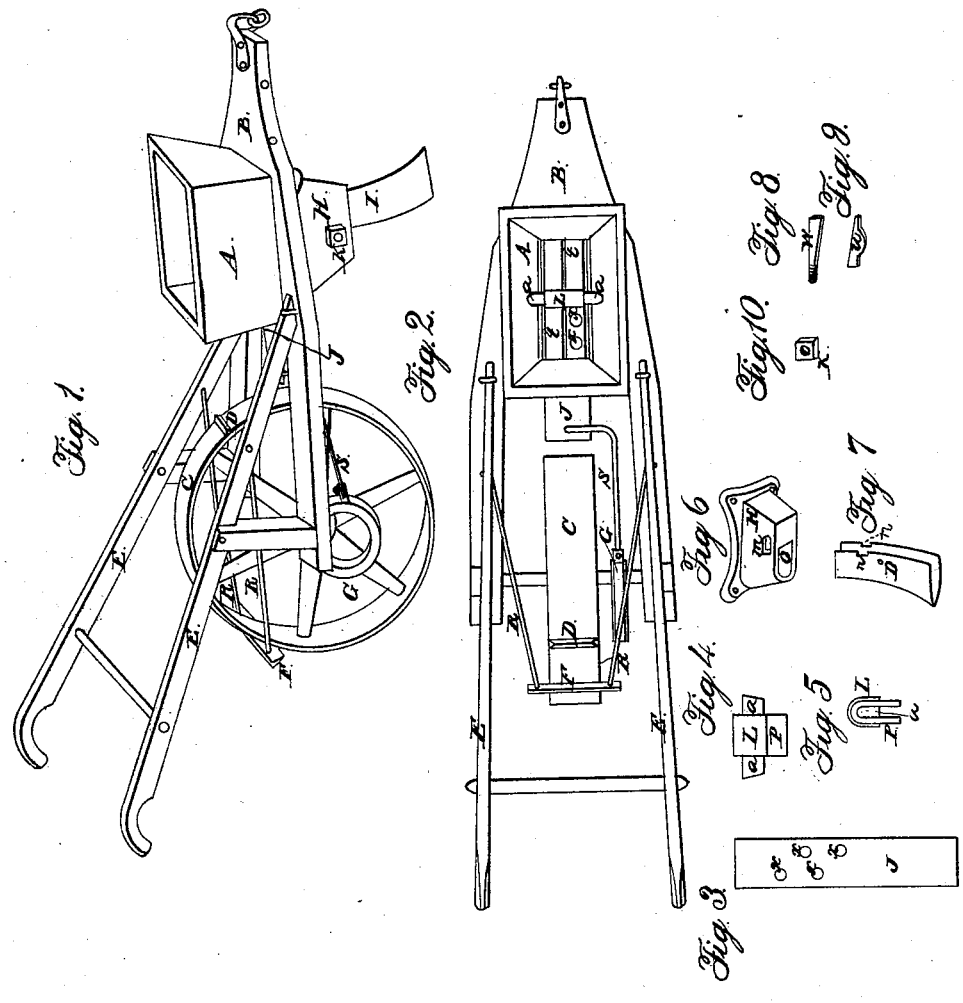

UNITED STATES PATENT OFFICE.

J. W. ELLS AND JAS. CHARLTON, OF PITTSBURG, PENNSYLVANIA.

IMPROVEMENT IN SEED-PLANTERS.

Specification forming part of Letters Patent No. 18,140, dated September 8, 1857.

*To all whom it may concern:*

Be it known that we, J. W. ELLS and JAS. CHARLTON, of Pittsburg, in the county of Allegheny and State of Pennsylvania, have invented a new and useful Improvement in Seed-Planters; and we do hereby declare that the following is a full, clear, and exact description thereof, reference being had to the accompanying drawings, which form part of this specification, and to the letters of reference marked thereon.

The seed-planter on which our improvements have been made has a metal plate bolted onto the frame underneath the hopper. On this plate there is a downward projection or flange, through which is formed a vertical slot for the reception of the upper end of the drill.

The first part of our improvement consists in combining with the vertical slot a transverse slot, key-wedge, and gib, and also providing the upper end of the drill with notches. The drill is inserted into the vertical slot made in the plate until the notches in the drill are opposite the small transverse slot. The gib is now placed in the slot and rests in the notches formed in the drill. The wedge now being driven in behind the gib, the drill is found to be securely and firmly fixed in its proper position, the notches guiding the operator to the correct adjustment of the drill.

Our second improvement consists in arranging the holes or cells in the reciprocating feed-slide, in combination with the cut-off slats in the bottom of the hopper, (underneath which the slide works,) in such a manner as to drop the seed at regular intervals and uniform distances, without regard to the inoperation of the slide during the passage of the eccentric over the extreme points in a line with the slide nearest and farthest from the hopper.

The third part of our improvement relates to the peculiar construction of the brush placed in the center of the hopper for the purpose of cutting off the flow of seed from the spout.

Our improvements consist, also, in the combination of two old and well-known devices—viz., a scraper for keeping the roller clean and a marker for indicating the hills of grain planted.

To enable others skilled in the art to fully understand our improvements, we will describe the accompanying drawings, of which—

Figure 1 represents a perspective view of a complete seed-planter embracing all of our improvements. Letter A indicates the hopper, which can be constructed in any of the well-known forms. B is the frame or body of the machine. C is the roller or driving-wheel. D is a marker placed across the face of the wheel, to indicate by the impress it leaves in the soil the hills of grain planted. E E are the handles of the machine, and are similar to plow-handles. F represents a scraper for the purpose of keeping the tread of the wheel clean. The scraper is attached to the handles by means of rods marked R R. The rods are riveted to the scraper at one end. On the other end is formed a kind of hook, made by bending the rods within a short distance of the end into an obtuse angle. These hooks, so formed, are sprung into holes made in the handles to receive them. This forms hinges or joints and allows the scraper to rest upon the wheel, its weight being sufficient to keep it down, while it is at liberty to rise to admit the passage of the marker, or, if not wanted, can be thrown over against the hopper, or by springing the rods together so as to detach the hooks the scraper can be removed. G is the eccentric, placed on the axle of the roller or driving-wheel. Around this eccentric passes an iron strap, free to work, and which communicates motion to the slide J by means of the curved rod $s$. H shows the extension formed on the cast-iron plate bolted on the frame underneath the hopper. Through this plate and extension there is a U-shaped vertical slot, into which the upper end of the drill marked I is inserted. Contiguous to the vertical slot is a small transverse slot, into which a gib and key-wedge are placed, the gib being next the drill opposite the notches formed in the stem, and the wedge being driven "home," the gib is forced into the notches, which hold the drill very firmly and securely in its place, but admit of its being easily detached by simply withdrawing the wedge. K is a nut on the small end of the wedge to add to the security of the parts.

Fig. 2 is a top view of the same machine.

Similar letters indicate like parts on all the figures.

In this drawing the interior of the hopper is shown with the arrangement of the holes in the feed-slide, which are marked X X, two only of which are exposed. By reference to Fig. 3 the peculiar arrangement can be seen. They are disposed diagonally on each side of a line down the center of the slide. L is a brush for cutting off the flow of seed from the hole in the plate, and prevents the seed from passing out of the hopper only as it is conveyed under the brush by the action of the slide. $t\ t$ are slats or small strips under which the slide works. One of these slats extends from one end of the hopper along its side to the brush, where it terminates. The other slat is placed along the other side, beginning at the other end of the hopper and terminating at the other side of the brush. The width of the slats being half the width of the slide, two holes at a time are exposed to be filled with seed; but as the slide progresses the holes on the other side will in turn be opened to the hopper to be filled with grain, then again to be drawn under the brush, that they may make their deposits in the spout leading to the ground. After dropping the seed the holes are prevented from again filling until the wheel has made a half-revolution, during which time the other holes are conveying seed to be dropped, and so on alternately during the travel of the machine over the ground. The slats make it necessary that the slide shall take seed on one side only in the outward motion and on the other side in the inward motion. The object to be accomplished by this arrangement is to overcome the difficulty arising from the inactivity of the slide during the passage of the eccentric over the points nearest and farthest from the hopper in a line corresponding with the travel of the machine, the wheel making an eighth of a turn before the slide moves, when it has approached either of these points, which is known by one of the middle holes being under the brush in the act of dropping the seed. Now, as there is so much travel of the wheel at this point without movement of the slide, it is necessary that the next hole conveying seed to be dropped should be placed in a closer proximity to the brush, so as to allow for the loss of motion at this particular point in the slide, and to accomplish this the holes must be placed as represented at Fig. 3, to be used in combination with the slats $t\ t$, as shown in Fig. 2.

Fig. 4 is a front view of the brush. Fig. 5 is an end view of the same, of which $a\ a$ is the wooden cross-bar, the ends being cut off at an angle to correspond with the pitch of the hopper, in which it is secured by screws or anything that will make it fast. P represents the elastic material, which in this case is india-rubber, but can be made of leather, gutta-percha, or anything else that will answer the purpose. The elastic material is bent over the cross-bar, (the top being rounded off for that purpose,) the ends extending down below the cross-bar, so as to rest upon the slide. It is now secured in that position by means of an iron clip. (Marked L.) This clip is a piece of sheet-iron one-eighth of an inch thick, bent so as to correspond with the exterior shape of the brush, on which it is placed like a saddle, the ends of the iron coming down no farther than the depth of the cross-bar. The sides of the clip now being compressed by a blow of a hammer or otherwise, the elastic material is found to be secured to the cross-bar in a strong and simple manner. The ends of the rubbers P, extending down beyond the clip L, and cross-bar $a$ form a double brush, having a space between the ends of the rubbers corresponding with the thickness of the cross-bar, and as the seed is brought under the middle of the brush the pressure is taken off the seed, enabling it to drop without difficulty. In the old method of constructing brushes for this purpose the pressure on the grain was constant and was sufficient to jam the seed in the slide, so as to prevent its dropping. Our improved brush obviates that difficulty.

Fig. 6 is the cast-iron plate detached from the body of the machine. H is the projection, through which is shown the vertical slot marked $o$, together with the small transverse slot marked $m$.

Fig. 7 represents the drill detached. $n\ n$ show the notches, which are the width of the transverse slot.

Fig. 8 represents the wedge.

Fig. 9 is the gib, having an enlargement in the middle. This prevents the sides of the drill from being drawn together, and also keeps the gib in its place.

Fig. 10 is a nut placed for security on the small end of the wedge.

To put the parts together, thrust the upper end of the drill I into the vertical slot marked $o$ in the extension H, as shown at Fig. 6, until the notches $n\ n$ are on a line with the transverse slot $m$. Now insert the gib with the enlargement toward the drill, place the wedge in behind the gib, put on the nut, and the parts are secure. The holes in the rounded corners of the plate, as shown at Fig. 6, are for the purpose of bolting the plate to the frame of the machine.

We claim—

The combination and arrangement of the reciprocating feed-slide J with the cut-off slats $t\ t$ and the brush L, in the manner and for the purpose as herein set forth.

J. W. ELLS.
JAS. CHARLTON.

Witnesses:
G. W. COFFIN,
S. SEVERANCE.